United States Patent [19]

Provan et al.

[11] Patent Number: 5,267,827
[45] Date of Patent: Dec. 7, 1993

[54] APPARATUS AND METHOD FOR AUTOMATICALLY COUNTING AND STACKING FORMED ARTICLES

[75] Inventors: Alexander R. Provan, Canandaigua; David G. Vanderlee, Macedon, both of N.Y.

[73] Assignee: Mobil Oil Corporation, Fairfax, Va.

[21] Appl. No.: 960,224

[22] Filed: Oct. 13, 1992

Related U.S. Application Data

[63] Continuation of Ser. No. 799,923, Nov. 26, 1991, abandoned, which is a continuation of Ser. No. 554,318, Jul. 18, 1990, abandoned.

[51] Int. Cl.⁵ ............................................. B65G 57/30
[52] U.S. Cl. ................................. 414/795.3; 414/790.3
[58] Field of Search ............... 414/675, 791.5, 792.7, 414/792.8, 793.4, 794.9, 795.2, 795.3, 901, 790.3

[56] References Cited

U.S. PATENT DOCUMENTS

| | | |
|---|---|---|
| 2,782,942 | 2/1957 | Scott . |
| 2,857,040 | 10/1958 | Campbell ............... 414/795.3 X |
| 3,330,423 | 7/1967 | Kirkhof ................. 414/788.9 X |
| 3,499,063 | 3/1970 | Ninneman et al. ............. 264/40 |
| 3,545,367 | 12/1970 | Smith et al. ............. 414/795.3 X |
| 3,583,579 | 6/1971 | Triggs ........................ 414/795.3 |
| 3,622,017 | 11/1971 | Meuller et al. ............. 414/901 X |
| 3,765,546 | 10/1973 | Westerling . |
| 3,844,423 | 10/1974 | Loomer et al. ............... 414/795.3 |
| 3,866,763 | 7/1975 | Alduk ..................... 414/795.3 X |
| 3,895,574 | 7/1975 | Nyborg .................. 414/795.3 X |
| 4,352,617 | 4/1980 | Sakai et al. ............. 414/795.2 X |
| 4,597,705 | 7/1986 | Scheller et al. ............... 414/30 |
| 4,684,308 | 8/1987 | Dorner ......................... 414/795.3 |
| 4,743,153 | 5/1988 | Kontz ...................... 414/795.3 X |
| 4,802,808 | 2/1989 | Wölk et al. ................... 414/789 |
| 4,834,606 | 5/1989 | Burns et al. ............... 414/900 X |

Primary Examiner—Michael S. Huppert
Assistant Examiner—Janice Krizek
Attorney, Agent, or Firm—Alexander J. McKillop; George W. Hager, Jr.; Michael J. Mlotkowski

[57] ABSTRACT

An apparatus for automatically counting and stacking articles, comprising: a conveyor for conveying a plurality of articles to at least one fixed stack position; and at least one stacking mechanism, the stacking mechanism comprising: an article carriage peripherally disposed about the fixed stack position, the carriage extending substantially perpendicular to the fixed stack position, wherein the carriage has at least one stacking dog for engaging and suspending articles above the fixed stack position; an article pusher located below the fixed stack position, the pusher capable of projecting an article positioned at the fixed stack position at a distance effective to engage the article with the stacking dogs and suspend the article therefrom; an article pullback mechanism positioned upstream of the article pusher for retaining subsequently conveyed articles in a queued relation; and a counter for counting articles suspended above the fixed stack position.

10 Claims, 8 Drawing Sheets

APPARATUS AND METHOD FOR AUTOMATICALLY COUNTING AND STACKING FORMED ARTICLES

This application is a continuation of application Ser. No. 07/799,923, filed Nov. 26, 1991, now abandoned, which is a continuation of application Ser. No. 07/554,318, filed Jul. 18, 1990, now abandoned.

FIELD OF THE INVENTION

The present invention relates to the receiving, stacking and counting of formed articles and, more particularly, to an apparatus for the automatic counting and stacking of mass produced nestled formed articles.

BACKGROUND OF THE INVENTION

In the mass production of formed articles, such as thermoformed containers, bowls, plates, trays and the like, the counting and stacking of those articles is often performed manually. In those operations employing manual stacking, the article, after it is formed, usually passes into a receptacle or onto a conveyor where it is thereafter manually arranged into a stack. As can be appreciated, this often proves to be quite labor intensive, compared with the rest of the production operation. In such operations, excessive labor costs are often experienced, providing the motivation to develop mechanized stackers.

A variety of specialized stackers are known to those skilled in the art. For example, U.S. Pat. No. 2,782,942 discloses a stacking machine for the automatic stacking of round concave-convex articles, such as targets. The machine includes an elongated horizontally disposed frame, as article supply means in connection with the frame for the delivery of a continuous stream of articles and a plurality of like stacking mechanisms arranged in series lengthwise. The stacking mechanisms then deliver the stacked articles to a discharge means or conveyor.

U.S. Pat. No. 3,499,063 discloses an apparatus for collecting and stacking plastic articles received from a blow molding machine. The articles are stacked in a stacking frame which retains the stack by having the lowermost article rest on a spring loaded pawl which extends into the path of incoming articles at the opening. The incoming article moves into the opening, depresses the pawl, moves past the pawl and nests into the stack of articles, lifting the stack from the pawl in the process. Thereafter, the stack of articles is lowered back onto the pawl where it rests until the next article is inserted.

U.S. Pat. No. 3,765,546 describes an apparatus for the stacking of relatively heavy objects such as bins of fruit. The bins are supported by dogs which are pivotally mounted upon a pair of carriages positioned at each side of a conveyor. The carriages are slidably mounted upon upright posts and are arranged for joint vertical movement on the posts. Rack and pinion drive is provided to effect the requisite movement of the system disclosed.

U.S. Pat. No. 4,597,705 relates to an apparatus for the automatic stacking of a predetermined number of pie shells in nested relation for subsequent packaging. The automatic stacking machine disclosed includes an inverted U-shaped structure, the legs of which straddle a conveyor on which the items to be stacked are carried to a location between the legs of the stacker. The legs of the stacker house like means for engaging the item to be stacked on opposite sides and lifting the item to an elevated position where it is deposited on holding means to be retained while the lifting means is returned to the lower position for engaging and lifting the next item to be stacked. When the desired number of items are held in the stack, an automatic kicker means pushes the stacked items off the holding means and onto means for delivering the stack for further processing.

U.S. Pat. No. 4,802,808 discloses a stacking apparatus for deep-drawn plastic articles. The apparatus includes a removal station formed by a support plate forwardly moveable horizontally underneath the raised stack of formed articles, a pushing device arranged above the support plate and moveable parallel relative to the support plate, and a tilting frame located adjacent the support plate when the support plate is in the forwardly moved position.

Although the aforementioned devices have generally performed their intended stacking function in an acceptable manner, it is to be noted that the devices disclosed generally do not meet the needs which exist in the mass production of formed articles, such as thermoformed containers, bowls, plates, trays and the like. When thermoforming such articles, generally several articles will be formed transversely across a single web of thermoplastic material. The same thermoforming line will often be used to produce a wide variety of thermoplastic articles, with this flexibility arising from the fact that the molds employed can be easily changed out and replaced. As can be seen, for an article stacking and counting machine to achieve maximum utility in thermoforming operations, it must possess at least the same degree of flexibility vis-a-vis the types of articles it can be adapted to handle as that of the thermoformer. Moreover, it must be able to count and stack articles at a speed which is at least about equal to that of the thermoformer for it to operate as an in-line unit. Additionally, the easily crushed, flexible nature of the formed thermoplastic articles renders them easily destroyed in conventional machine stacking operations. None of the machines known in the art possess the type of utility required by the aforementioned forming operation.

Therefore what is needed is an apparatus and method for automatically counting and stacking formed articles which provides the speed, accuracy and flexibility required in the mass production of formed articles, such as thermoformed containers, bowls, plates, trays and the like.

SUMMARY OF THE INVENTION

In accordance with the present invention, there is provided an apparatus for automatically counting and stacking articles, comprising: a conveyor means for conveying a plurality of articles to at least one fixed stack position; and at least one stacking mechanism, the stacking mechanism comprising: an article carriage means peripherally disposed about the fixed stack position, the carriage means extending substantially perpendicular to the fixed stack position, wherein the carriage means has at least one stacking dog for engaging and suspending articles above the fixed stack position; an article pushing means located below the fixed stack position, the pushing means capable of projecting an article positioned at the fixed stack position at a distance effective to engage the article with the stacking dog and suspend the article therefrom; an article pullback mechanism positioned upstream of the article pushing means for retaining subsequently conveyed articles in a queued relation; and means for counting articles suspended above the fixed stack position. Also provided is a method for automatically counting an stacking articles comprising the steps of: (a) setting an article count value, the article count value equal to a completed stack of articles; (b) conveying a plurality of articles to at least one fixed stack position; (c) detecting the presence of an article at the fixed stack position; (d) pushing an article located at the fixed stack position to a stack level for accumulating articles; (e) retaining an article located substantially adjacent to the fixed stack position while the article located at the fixed stack position is undergoing the pushing step; and (f) repeating steps (b) through (e) until the article count value is achieved.

Therefore, it is an object of the present invention to provide an apparatus for automatically counting and stacking articles which is capable of operating in-line with an article forming operation.

It is another object of the present invention to provide an apparatus for automatically counting and stacking articles which may easily be reconfigured to function with a variety of formed articles.

It is a further object of the present invention to provide an apparatus which receives articles formed from a sheet of thermoplastic material and automatically counts and stacks such articles at the high speeds required of mass production operations even when such articles are formed in several transversely disposed rows at a time.

It is yet another object of the present invention to provide an apparatus for automatically counting and stacking articles which operates at the high speeds required of mass production operations without crushing the articles so stacked.

It is still a further object of the present invention to provide a method for automatically counting and stacking formed articles which may be adapted to a wide variety of formed articles.

Other objects and the several advantages of the present invention will become apparent to those skilled in the art upon a reading of the specification and the claims appended thereto.

DETAILED DESCRIPTION OF THE INVENTION

Figure 1:
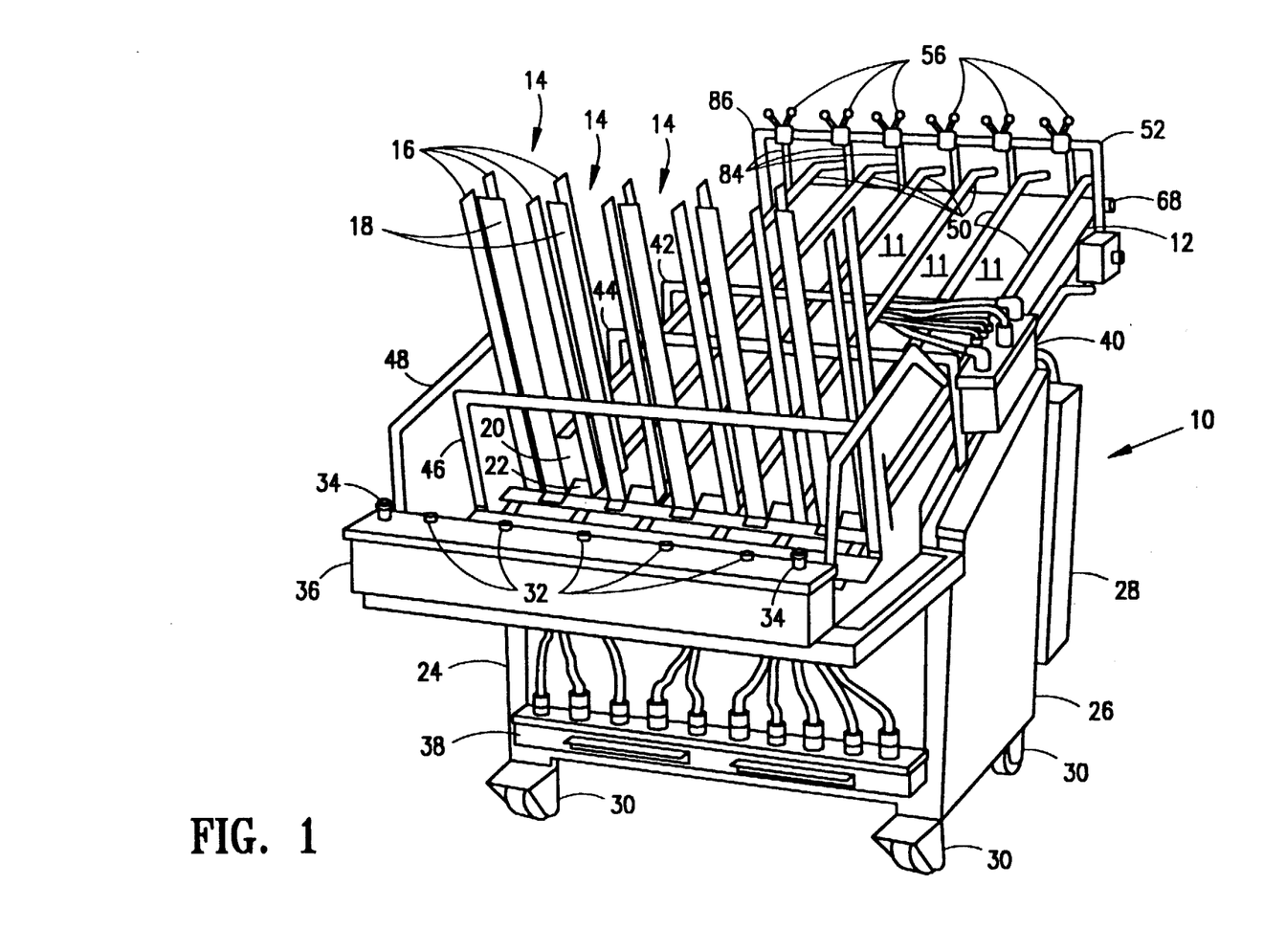
FIG. 1 is a view in perspective of one embodiment of an apparatus for automatically counting and stacking formed articles, in accordance with the present invention.

The present invention is best understood by reference to the appended figures, which are given by way of example and not of limitation. Referring now to FIG. 1, a preferred embodiment of the apparatus of the present invention is shown in perspective view. Apparatus 10 is depicted with certain operator safety guard plates removed to better reveal the operational features of the invention. Also absent from this view are pullback mechanisms 70 which are shown installed on apparatus 10 in FIG. 2. Apparatus 10 is designed to automatically count and stack articles fed to it from an article forming operation, such as a thermoforming operation. As shown, apparatus 10 is configured to receive five streams of articles simultaneously, although, as is preferred, apparatus 10 can advantageously accommodate variations in the number of article streams to be handled. Apparatus 10 may be designed for portability, as is preferred, by providing casters 30.

In operation, apparatus 10 is positioned at the article exit end of an article forming machine, so that conveyor 12 is positioned to receive the articles emanating therefrom. Guide rails 50 are positioned so as to define a plurality of tracks 11, each track aligned to receive a stream of articles from the forming operation. The articles are maintained in close relation with conveyor 12 by the provision of upper top guide assembly 52 which consists of upper top guides 84, adjustably positioned along rail member 86 using clamps 56.

Figure 2:
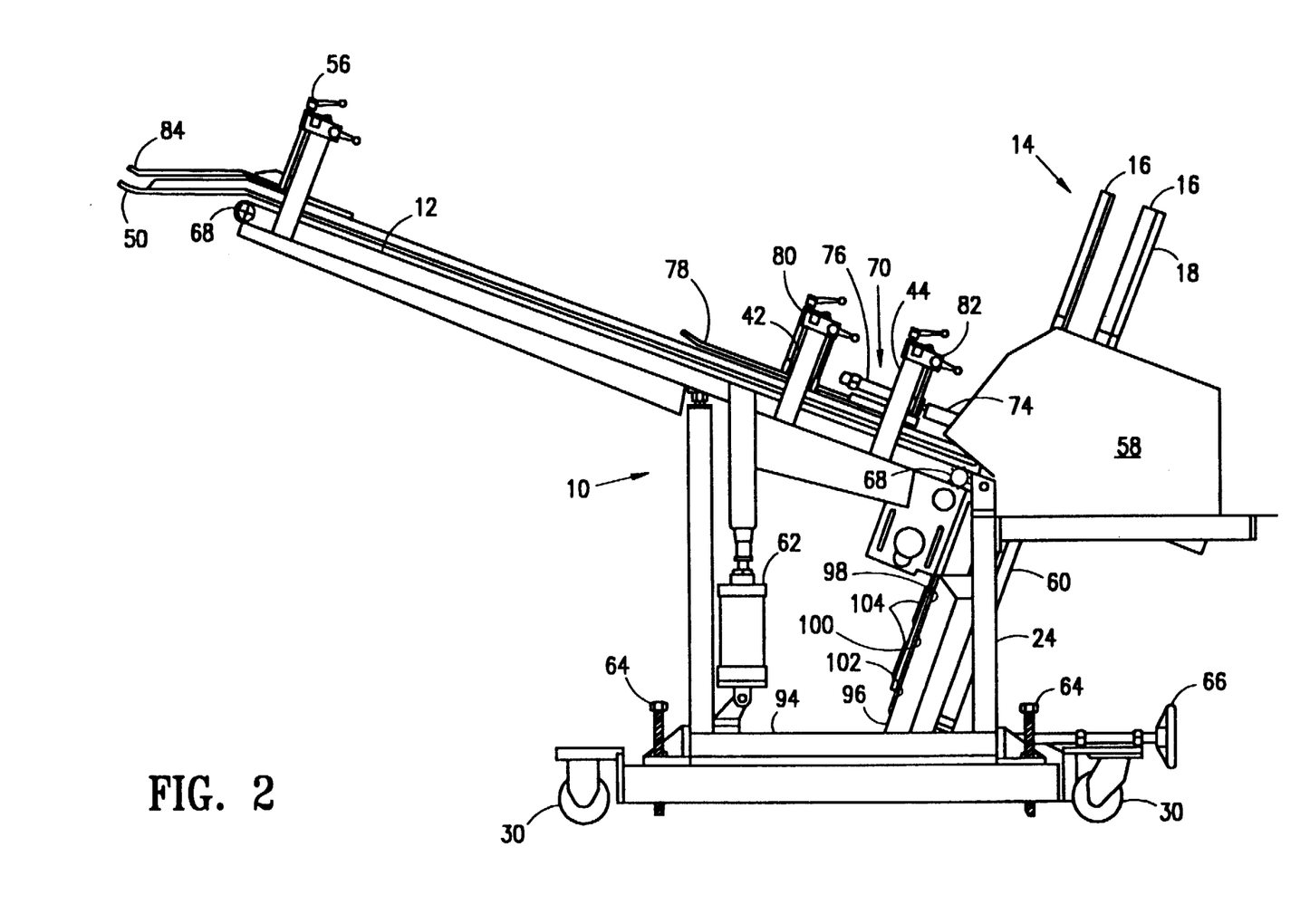
FIG. 2 is a side plan view of the FIG. 1 apparatus for automatically counting and stacking formed articles.
Figures 3, 3A, 3B:
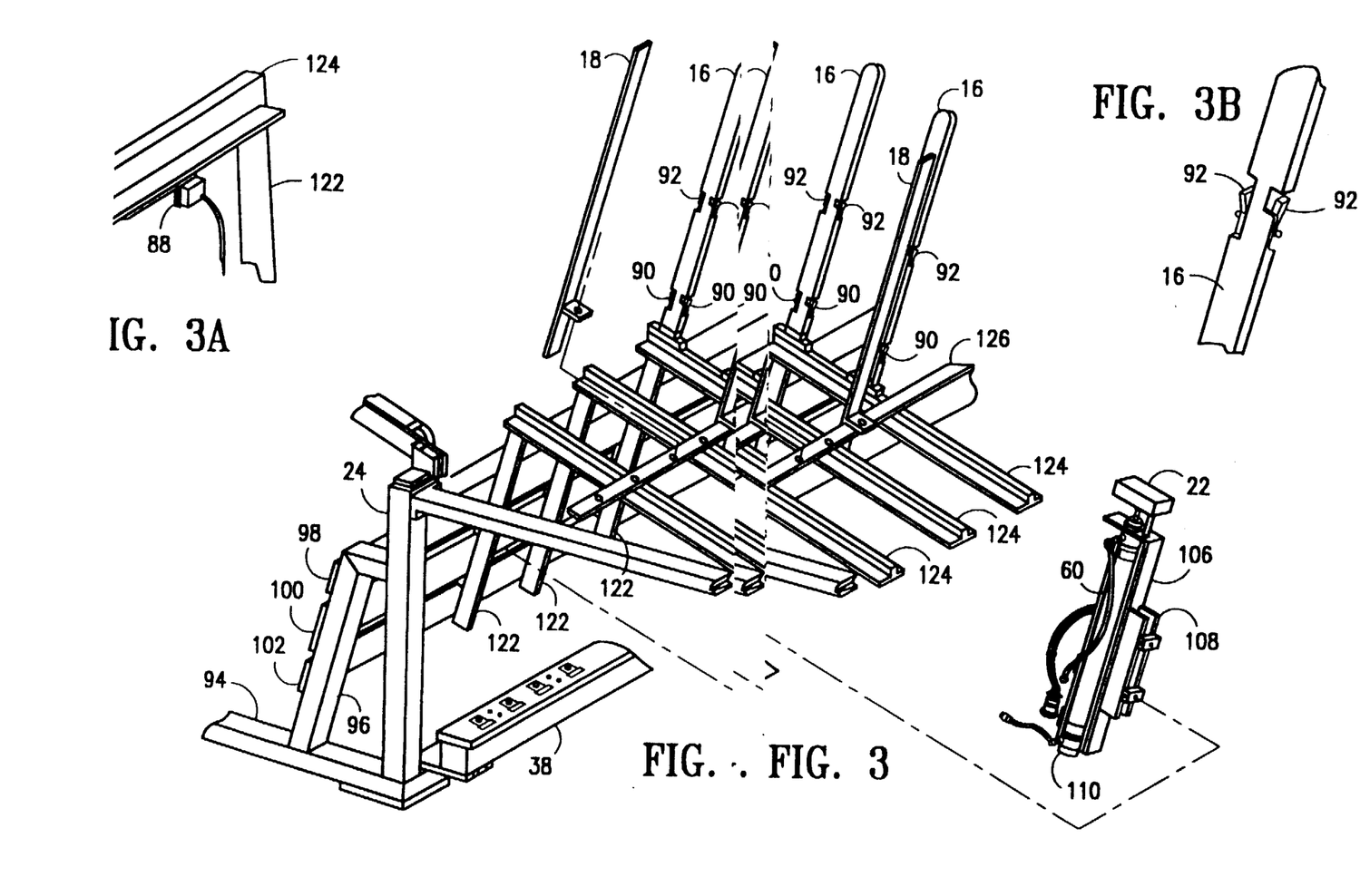
FIG. 3 is a partial exploded view of the lower frame assembly of the FIG. 1 embodiment.
FIG. 3A depicts a preferred location of an article sensing means in the lower frame assembly of the apparatus for automatically counting and stacking formed articles.
FIG. 3B presents a detailed view of a pair of stacking dogs.
Figure 5:
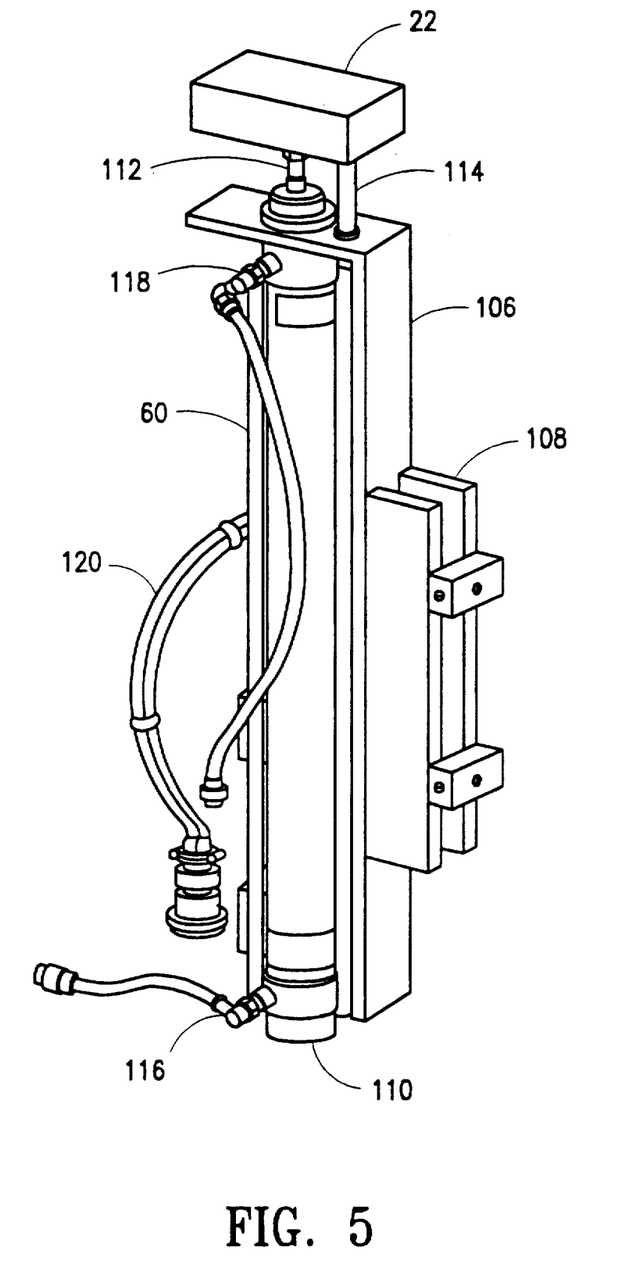
FIG. 5 is an exploded view of an article pusher means.

An article received within a track 11 for stacking will travel along conveyor 12 until reaching a fixed stack position 20, each track 11 having its own fixed stack position 20. When located at fixed stack position 20, the article will also be positioned directly over pusher plate 22 of article pusher means 60 (article pusher means 60 is shown in FIGS. 2, 3 and 5). The article is then pushed upwardly and substantially perpendicular to fixed stack position 20 into article carriage means 14. In a preferred embodiment, an article sensing means 88 (shown in FIG. 3A) is utilized to detect the presence of an article at fixed stack position 20 for operation thereon by article pusher means 60.

As may be seen in the FIG. 1 embodiment, each article carriage means 14 is comprised of a plurality of stack bars 16 and a back-up bar 18. Articles are retained in carriage means 14 by stacking dogs 90 (see FIGS. 3 and 3B) which may be spring biased outward to provide support for the articles to be stacked thereon at the stacking level. Referring still to FIGS. 3 and 3B, when a predetermined article count is achieved, the completed stack is ejected upward to a second set of stacking dogs 92, said second set of stacking dogs 92 defining a stack removal position level. Referring again to FIG. 1, in a preferred embodiment, when a completed stack of articles is located at the stack removal position, a "stack full" indicator light 32 is illuminated, indicating to the operator that it is to be removed promptly. While the stack awaits removal from the set of stacking dogs 92, the counter is reset and stacking is resumed.

As can be appreciated by those skilled in the art, article sensing, counting, stacking and stack ejection operations, as well as other apparatus control functions can be controlled through the use of a microprocessor. Such control technology, being well known, requires no further explanation for a complete understanding of the present invention. Any of a number of commercially available controllers are considered to be suitable in the practice of the present invention. The controller utilized in apparatus 10 is located within cabinet 28. Additionally, to rapidly shut down apparatus 10 in the event of an article jam or safety related problem, stop buttons 34 are located at a plurality of locations about the unit.

Referring now to FIG. 2, a side plan view of apparatus 10 is presented. In this view, article pullback mechanism 70 is shown in its installed position. As can be envisioned, each track 11 of apparatus 10 has an article pullback mechanism 70 installed as indicated in FIG. 2. In a manner similar to that of the upper portion of apparatus 10, articles passing to the lower portion of apparatus 10, are maintained in close relation with conveyor 12 by the provision of lower top guides 78, which are a part of article pullback mechanism 70 assembly (see FIG. 7). Lower top guides 78 are adjustably positioned along rail member 42 using clamps 80. Also shown in FIG. 2 is the location of article pusher means 60, which is shown in still more detail in FIGS. 3 and 5. The plurality of article pusher means 60 are mounted to templates 104, which in turn are mounted to mounting plates 98, 100 and 102. Mounting plates 98, 100 and 102 are themselves mounted to lower support member 96. Details of this structure are provided in FIGS. 3 and 4 to which attention is directed for such details.

Referring again to FIG. 2, to increase the flexibility of apparatus 10, it can be provided with conveyor incline adjusting mechanism 62. Conveyor incline adjusting mechanism 62 can comprise a hydraulic jack mechanism (as shown), a screw jack mechanism, or the like, as those skilled in the art readily recognize. Also, although casters 30 may advantageously be provided to aid in the portability of apparatus 10, lock-down pins 64 may optionally be provided to fix the position of apparatus 10 during line operation. As an alternative to lock-down pins 64, caster brakes (not shown) may alternatively be provided. To prevent inadvertent operator contact during operation, safety guard 58 is provided. Other guards may also be optionally provided in locations where operator contact is likely.

Figure 4:
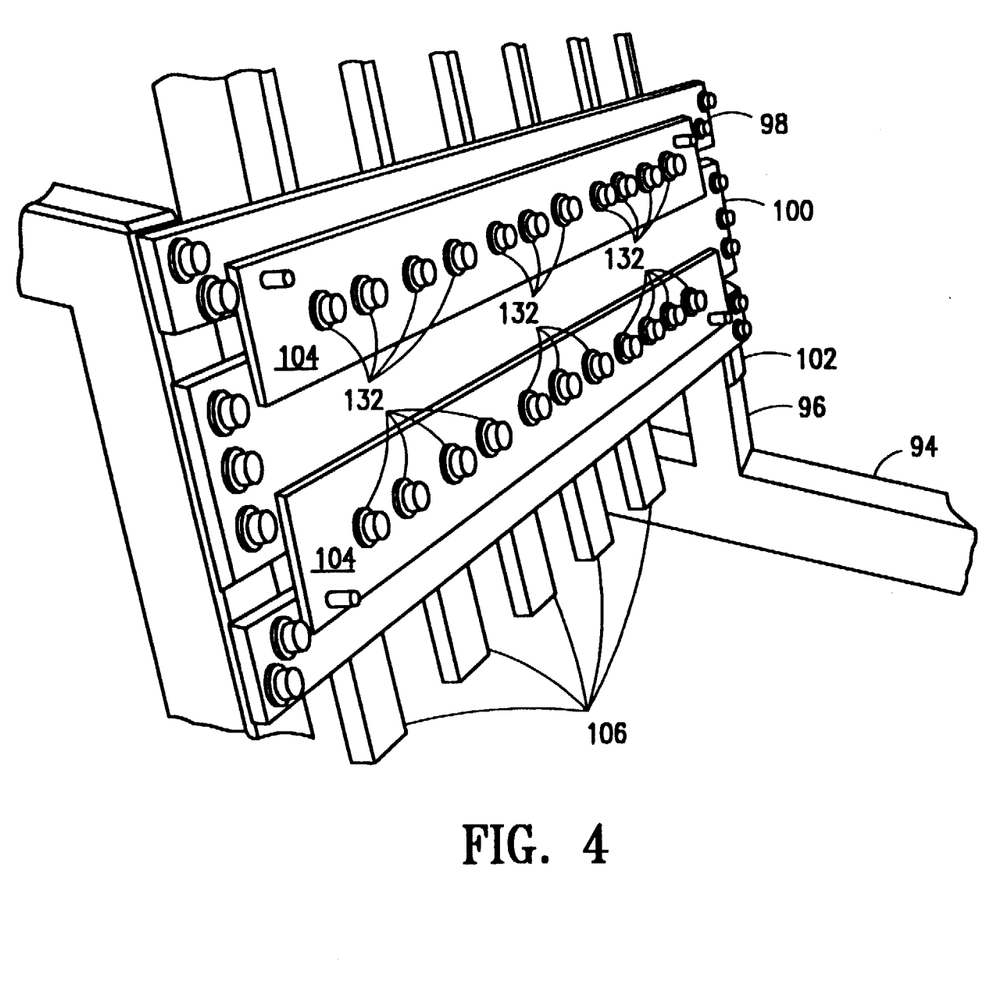
FIG. 4 is a detailed view showing a pair of assembly templates mounted on the lower frame assembly of the apparatus.

Referring again to FIG. 3, a partial exploded view of the lower frame assembly shown in FIG. 2 is presented. The lower frame assembly is advantageously designed to permit apparatus 10 to function in a wide variety of configurations, since it is fully adjustable to handle a varied number of product streams. This is accomplished through the use of templates 104 (see FIG. 4) which are designed for a particular article to be produced. Templates 104 provide a plurality of locator holes 132 for the mounting thereto of assembly mounting bracket 108 of bracket 106 of article pusher means 60, as well as lower carriage support members 122. Lower carriage support members 122 are shown in mounted position in FIG. 3, while a plurality of brackets 106 of article pusher means 60 are shown in mounted position in FIG. 4. As shown in FIG. 4, templates 104 are affixed to mounting plates 98, 100 and 102 which are themselves mounted to lower support member 96. One end of lower support member 96 is attached to horizontal frame member 94, the other to vertical frame member 24 (see FIG. 3).

As can be appreciated, the number and spacing of article pusher means 60, article carriage means 14, conveyor tracks 11 and the like are dictated by locator holes 132 of templates 104. For a line which is required to produce a variety of products on a batch run basis, a set up operator can be provided with sets of templates 104 designed for each product to be produced, in advance, facilitating the quick conversion of the apparatus to a given product run. The modular nature of the apparatus provides an apparatus particularly well suited to thermoforming operations designed to handle thermoplastic webs of a fixed width wherein the molds are changed out from time to time produce a variety of products.

A preferred article pusher means 60 is shown, enlarged, in FIG. 5. Article pusher means 60 is comprised of an air cylinder 110 having an air inlet line 116 and an air exit line 118 for pressurizing and de-pressurizing air cylinder 110, respectively. Electrical connector line 120 is provided to control the operation of article pusher means 60. As can be envisioned, when activated, rod 112 will rise to the desired level, pushing the article in contact with pusher plate 22 to the stack position level defined by the plane in which lower stacking dogs 90 lie (see FIG. 3). As mentioned, when a stack is completed, i.e., the desired number of articles reside therein, rod 112 will be activated so as to rise to the stack removal level defined by the plane in which upper stacking dogs 92 lie. To prevent the rotation of pusher plate 22 in operation, as well as to improve stability, rod 114 is provided. As shown, rod 114 is not located within air cylinder 110, being located outside of same and freely moveable within bracket 106. Affixed to bracket 106 is assembly mounting bracket 108. As described above, assembly mounting bracket 108 is affixed to templates 104. It is to be noted that while an electro-pneumatic article pushing means has been described and is preferred for use in the practice of the present invention, other types of mechanisms may also provide satisfactory operation, as those skilled in the art will readily understand.

Figure 6:
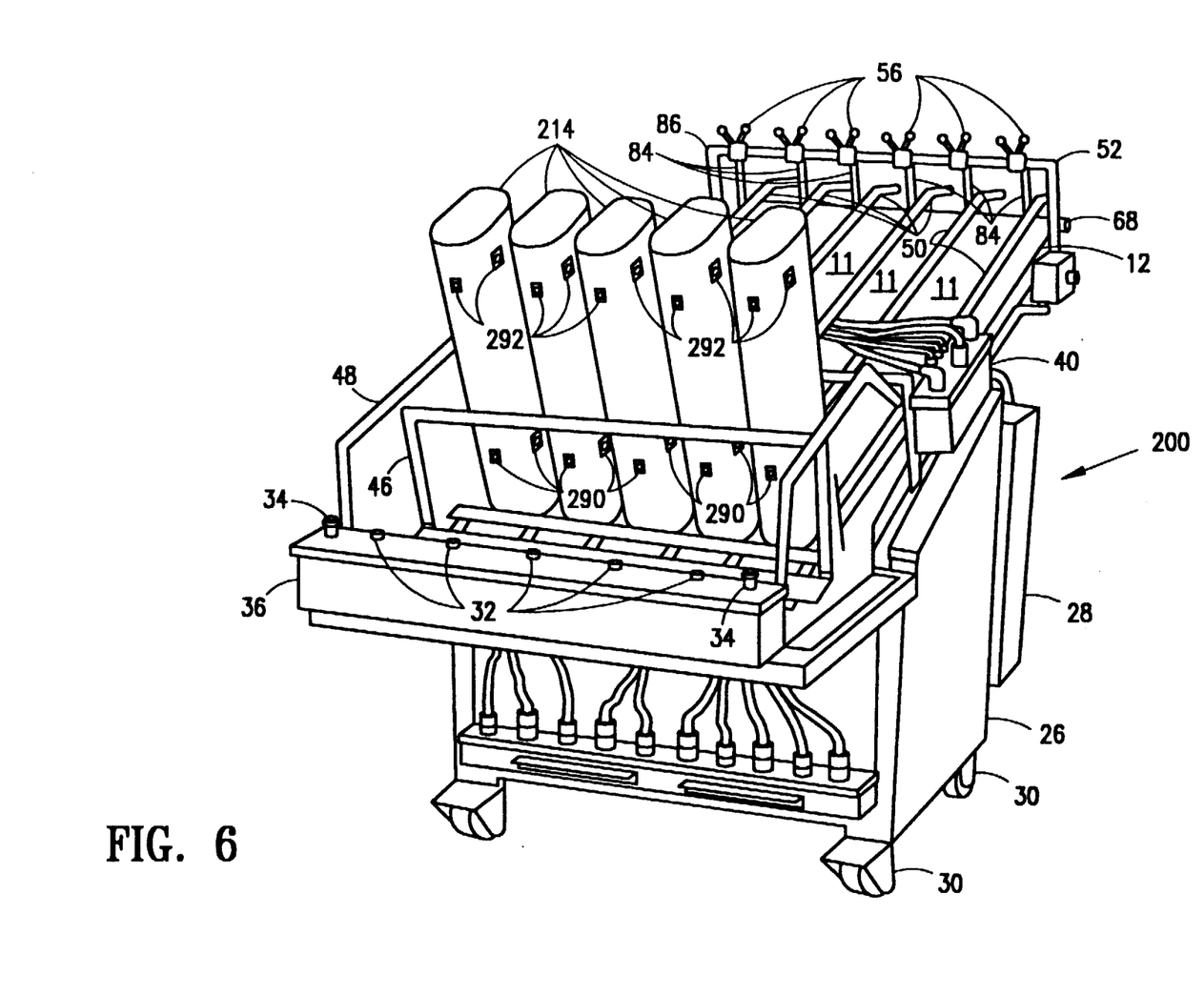
FIG. 6 is a view in perspective of another embodiment of the apparatus of the present invention in which a substantially enclosed carriage means is employed.

Referring now to FIG. 6, a view in perspective of another embodiment of the apparatus of the present invention is shown in which a substantially enclosed carriage means 214 is employed. The use of substantially enclosed carriage means 214 is particularly beneficial when circular or oval-shaped articles are to be stacked and counted. This benefit results from the increased flexibility provided to properly mount the plurality of lower stacking dogs 290 and upper stacking dogs 292 peripherally about substantially enclosed carriage means 214. As shown in FIG. 6, rather than engaging the articles to be stacked at or near their corners as the carriage means 14 comprised of a plurality of stack bars 16 depicted in FIG. 1 does, radial engagement can be advantageously provided. It is to be noted that while carriage means 14, depicted in the FIG. 1 embodiment, can be configured to function with circular or oval-shaped articles, carriage means 214 has been found to produce superior results. Further, as can be appreciated, the remainder of apparatus 200 is substantially the same as apparatus 10, previously described. Therefore, with only minor changes and adjustments carriage means 214 can directly replace carriage means 14 and the apparatus changed from handling substantially square or rectangular articles to handling circular or oval-shaped articles.

Figure 7:
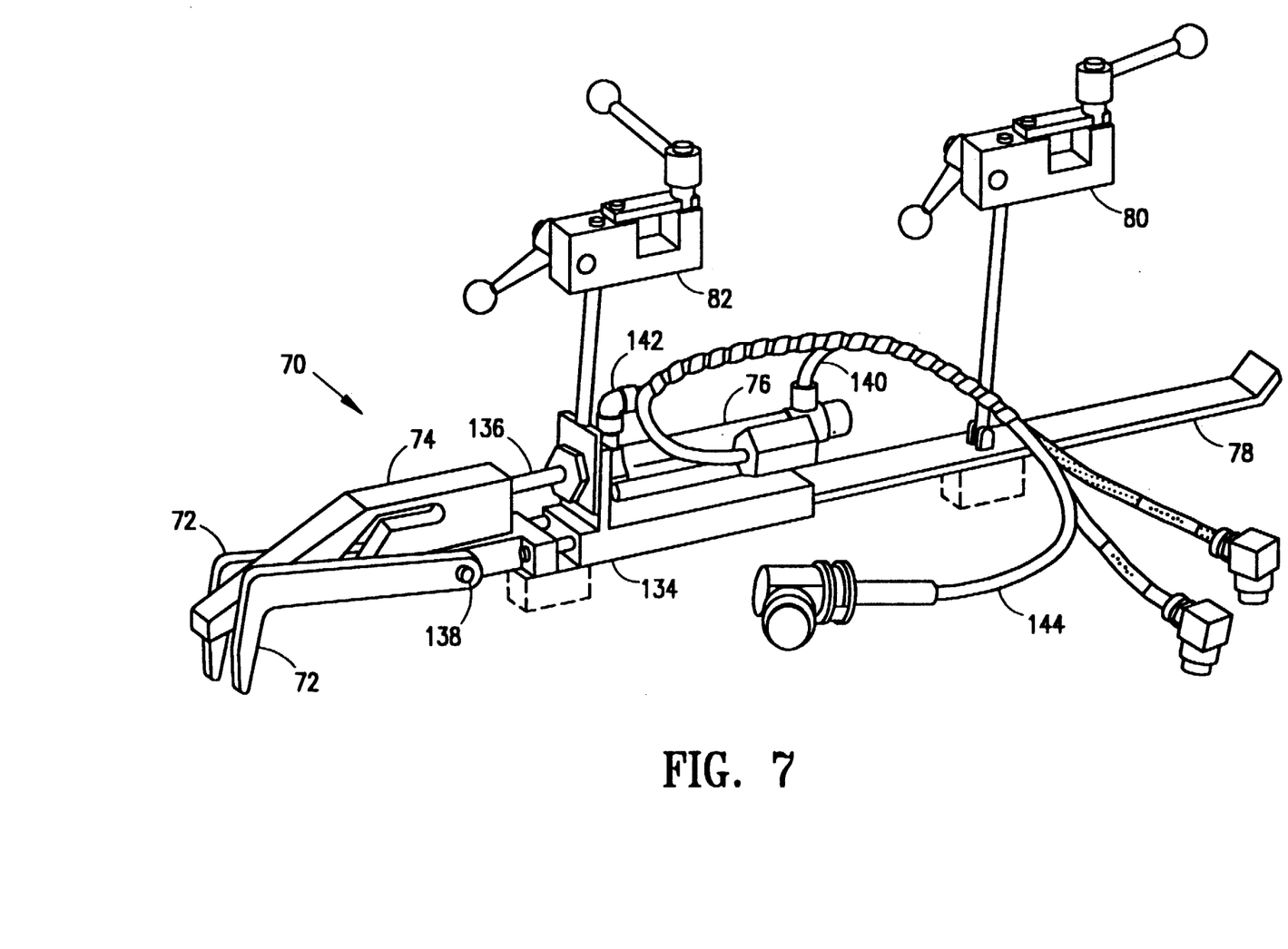
FIG. 7 is a perspective view of an article pullback mechanism, in accordance with the present invention.

Referring now to FIG. 7, a perspective view of article pullback mechanism 70, in accordance with the present invention, is shown. Article pullback mechanism 70 may be seen to comprise lower top guide 7 to maintain articles in close relation with conveyor 12, air cylinder 76 for activating the pullback mechanism, article hold-down wedge 74 affixed to one end of rod 136, bracket 134 and a pair of pullback hooks 72 pivotally mounted using pin 138. Air cylinder 76 has an air inlet line 140 and an air exit line 142 for pressurizing and de-pressurizing air cylinder 76, respectively. Electrical connector line 144 is provided to control the operation of article pullback mechanism 70. As can be envisioned, when activated, rod 136 will extend itself and article hold-down wedge 74 causing pullback hooks 72 to rise above conveyor 12. When deactivated, pressure is released, causing pullback hooks 72 to drop into position to engage an article in queue to be stacked.

Figure 8:
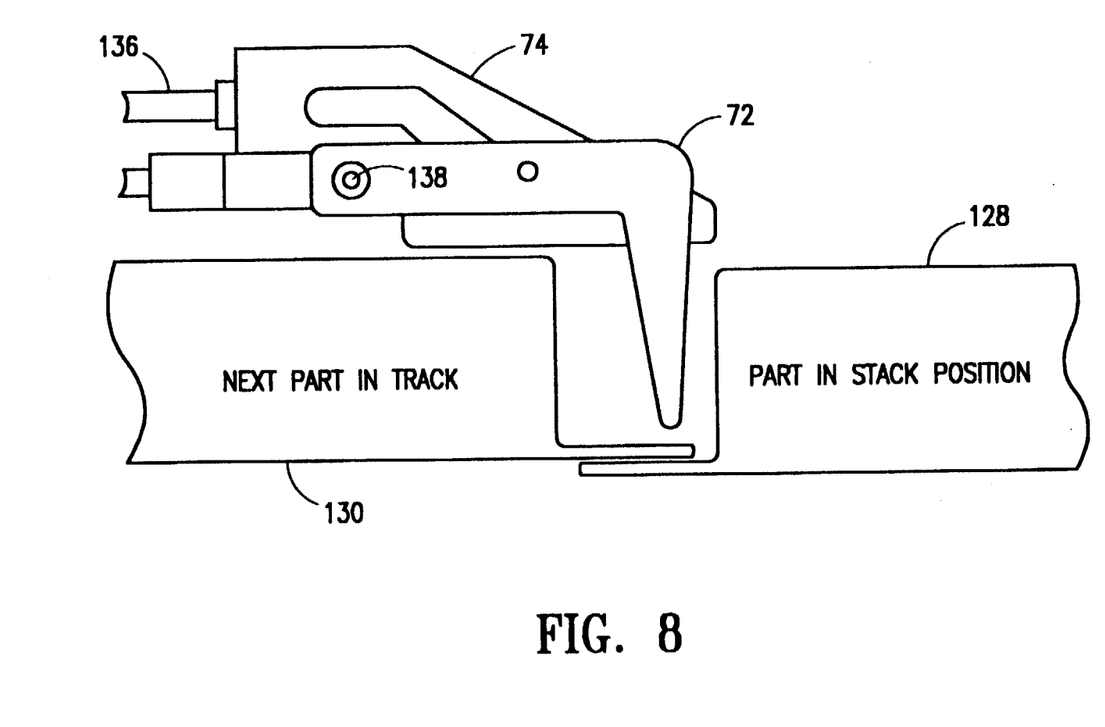
FIG. 8 is a schematic representation depicting an article pullback mechanism in operation.

Referring now to FIG. 8, the operation of article pullback mechanism 70 is schematically depicted. As shown, article 128 is in the fixed stack position awaiting stacking, and the next article to be stacked, article 130, has already arrived. A problem can arise when the lips of article 128 and article 130 overlap as shown. As can be envisioned, without article pullback mechanism 70, when article pusher means begins to lift article 128, one end of article 130 will also rise from the track. This undesirable situation can result in jamming, misalignment and line downtime. Through the use of article pullback mechanism 70, the lip of article 130 is pulled backwards, off of the lip of article 128 and retained there until article 128 is stacked and article pusher means 60 is ready to receive article 130. As can be appreciated, the coordination of article pullback mechanism 70 can be accomplished using the microprocessor control system previously discussed.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An apparatus for automatically counting and stacking articles, comprising:
   (a) an inclined conveyor means for conveying a plurality of articles to a plurality of fixed stack positions; and
   (b) a plurality of stacking mechanisms, each of said stacking mechanisms disposed about a respective fixed stack position, each of said stacking mechanisms comprising:
      (i) an article carriage means peripherally disposed about said fixed stack position, said carriage means comprising a plurality of stack bars extending substantially perpendicular to said fixed stack position, wherein each of said stack bars has a first pivotable stacking dog for engaging and suspending articles above said fixed stack position at a stacking level and at least a second stacking dog located above said first stacking dog for engaging and suspending a completed stack of articles above said stacking level;
      (ii) an article pushing means located below said fixed stack position, said pushing means capable of projecting an article positioned at said fixed stack position at a distance effective to engage the article with said stacking dogs and suspend the article therefrom;
      (iii) an article pullback mechanism positioned upstream of said article pushing means for retaining subsequently conveyed articles in a queued relation, said article pullback mechanism including a lower top guide to maintain the articles in close relation to said inclined conveyor means and a pair of pivotally mounted pullback hooks;
      (iv) means for counting articles suspended above said fixed stack position; and
      (v) an article sensor located at said fixed position for sensing an article's presence;
   wherein said inclined conveyor means is divided longitudinally into a plurality of tracks each of said tracks conveying a plurality of articles to a fixed stack position and each fixed stack position having a stacking mechanism disposed in cooperation therewith.

2. The apparatus of claim 1, wherein said article pusher means is electro-pneumatically operated.

3. The apparatus of claim 2, further comprising a microprocessor controller.

4. The apparatus of claim 3, wherein said article pusher means is electro-pneumatically operated.

5. The apparatus of claim 4, further comprising a microprocessor controller.

6. The apparatus of claim 1, wherein said article carriage means comprises a substantially enclosed elongated hollow member having an interior periphery corresponding in shape to the shape of the articles to be stacked within.

7. The apparatus of claim 6, wherein said first stacking dog is one of a set of first stacking dogs peripherally disposed about said substantially enclosed elongated hollow member for engaging and suspending articles above said fixed stack position at a stacking level.

8. The apparatus of claim 7, wherein said at least a second stacking dog is one of a set of second stacking dogs peripherally disposed about said substantially enclosed elongated hollow member and located above said first stacking dogs for engaging and suspending a completed stack of articles above said stacking level at a removal level.

9. The apparatus of claim 8, wherein said article pushing means is electro-pneumatically operated.

10. The apparatus of claim 9, further comprising a microprocessor controller for controlling the operation thereof.

* * * * *